United States Patent
Hildrum et al.

(10) Patent No.: US 8,484,649 B2
(45) Date of Patent: Jul. 9, 2013

(54) AMORTIZING COSTS OF SHARED SCANS

(75) Inventors: Kirsten W. Hildrum, Hawthorne, NY (US); Rohit M. Khandekar, Elmsford, NY (US); Sujay S. Parekh, Dobbs Ferry, NY (US); Deepak Rajan, Fishkill, NY (US); Joel L. Wolf, Katonah, NY (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 12/984,909

(22) Filed: Jan. 5, 2011

(65) Prior Publication Data

US 2012/0174110 A1    Jul. 5, 2012

(51) Int. Cl.
    *G06F 9/46*    (2006.01)
(52) U.S. Cl.
    USPC ........................................................ 718/102
(58) Field of Classification Search
    None
    See application file for complete search history.

(56) References Cited

U.S. PATENT DOCUMENTS

| | | | |
|---|---|---|---|
| 5,692,174 A | 11/1997 | Bireley et al. | |
| 5,987,477 A | 11/1999 | Schmuck et al. | |
| 7,490,089 B1 | 2/2009 | Georgiev | |
| 2003/0191795 A1* | 10/2003 | Bernardin et al. | 709/105 |
| 2004/0133540 A1 | 7/2004 | Saake et al. | |
| 2006/0173851 A1 | 8/2006 | Singh et al. | |
| 2008/0027920 A1 | 1/2008 | Schipunov et al. | |
| 2008/0133474 A1 | 6/2008 | Hsiao et al. | |
| 2009/0216718 A1 | 8/2009 | Agrawal et al. | |
| 2010/0106697 A1 | 4/2010 | Enoki et al. | |
| 2010/0175049 A1 | 7/2010 | Ramsey et al. | |

OTHER PUBLICATIONS

Zaharia et al., "Job Scheduling for Multi-User MapReduce Clusters," Technical Report EECS-2009-55, UC Berkeley, 2009.
Wolf et al., "FLEX: A Slot Allocation Scheduling Optimizer for MapReduce Workloads," Proceedings of Middleware, Bangalore, India 2010.
Agarwal et al., "Scheduling Shared Scans of Large Data Files," Proceedings of the VLDB Endowment, Auckland, New Zealand, 2008.

* cited by examiner

*Primary Examiner* — Emerson Puente
*Assistant Examiner* — Gregory A Kessler
(74) *Attorney, Agent, or Firm* — Ryan, Mason & Lewis, LLP

(57) ABSTRACT

Techniques for scheduling a plurality of jobs sharing input are provided. The techniques include partitioning one or more input datasets into multiple subcomponents, analyzing a plurality of jobs to determine which of the plurality of jobs require scanning of one or more common subcomponents of the one or more input datasets, and scheduling a plurality of jobs that require scanning of one or more common subcomponents of the one or more input datasets, facilitating a single scanning of the one or more common subcomponents to be used as input by each of the plurality of jobs.

22 Claims, 9 Drawing Sheets

FIG. 5

GENERALIZED SMITH'S RULE PSEUDO-CODE FOR AVERAGE RESPONSE TIME

1: for $j = 1$ to $J$ do
2:   Create ordered chain of subjobs $\mathcal{L}_j = \{(j, 1), ..., (j, K_j^1)\}$ for job $j$, where $K_j^1$ represents the last subjob of job $j$, where subjob $(j, k)$ has processing time $p_{j,k}$ and weight $w_{j,k}$.
3:   Set $K_j^0 = 1$
4: end for
5: Set $\mathcal{L} = \cup_{j=1}^{J} \mathcal{L}_j$
6: while $\mathcal{L} \neq \emptyset$ do
7:   Compute for each subjob $s$ between $K_j^0$ and $K_j^1$ the partial ratio of sums
     $\sum_{k=K_j^0}^{s} p_{j,k} / \sum_{k=K_j^0}^{s} w_{j,k}$
8:   Find job $\bar{j}$ and subjob $\bar{s}$ for which the partial ratio is minimized
9:   Schedule subjobs $(\bar{j}, K_j^0), ..., (\bar{j}, \bar{s})$
10:  Set $\mathcal{L} = \mathcal{L} - \{(\bar{j}, K_j^0), ..., (\bar{j}, \bar{s})\}$
11: end while

FIG. 6

BACKWARDS DYNAMIC PROGRAMMING PSEUDO-CODE FOR MINIMAX PROBLEMS

1: Set $\mathcal{J} = \{1, ..., J\}$
2: Compute the subset $\mathcal{J}' = \{j \in \mathcal{J} | \nexists j' \in \mathcal{J}, j' \prec j\}$
3: while $\mathcal{J}' \neq \emptyset$ do
4:   Compute $j^* = arg\ min_{j \in \mathcal{J}'}\ F_j(\sum_{j \in \mathcal{J}} p_j)$
5:   Remove $j^*$ from $\mathcal{J}$
6:   Recompute $\mathcal{J}'$
7: end while

FIG. 7

READY-LIST MALLEABLE PACKING SCHEME PSEUDO-CODE

1: Set time $T_0 = 0$
2: Create list $\mathcal{L} = \{1, ..., J\}$ of subjobs, ordered by priority and respecting precedence
3: Create sublist $L_1$ of ready jobs
4: for $i = 1$ to $J$ do
5:    Allocate $m_j$ slots to each job $j \in L_1$ with implied ordering
6:    Set $L_2 = L_1$, with implied ordering
7:    Compute slack $s = S - \sum_{j \in L} m_j$
8:    while $s > 0$ do
9:      Allocate $\min(s, M_j - m_j)$ additional slots to highest priority job $j \in L_2$
10:      Set $L_2 = L_2 \setminus \{j\}$
11:      Set $s = s - \min(s, M_j - m_j)$
12:    end while
13:    Find first job $j \in L_1$ to complete under given allocations
14:    Set $T_i$ to be the completion time of job $j$
15:    Set $L_1 = L_1 \setminus \{j\}$
16:    Add all immediate successor jobs to $j$ in ready list $L_1$
17:    Compute remaining work for jobs in $\mathcal{L}$ after time $T_i$
18: end for

US 8,484,649 B2

AMORTIZING COSTS OF SHARED SCANS

GOVERNMENT CONTRACT

This invention was made with Government support under Contract No.: H98230-07-C-0383 awarded by the United States Department of Defense. The Government has certain rights in this invention.

FIELD OF THE INVENTION

Embodiments of the invention generally relate to information technology, and, more particularly, to shared scanning.

BACKGROUND OF THE INVENTION

The MapReduce programming model is designed to be parallelized automatically and can be implemented on large clusters of commodity hosts. Scheduling, fault tolerance and necessary communications can also be handled automatically without direct user assistance.

An example issue in MapReduce environments is the design of a high quality schedule for multiple MapReduce jobs. A scheduler such as, for example, First In, First Out (FIFO), however, is known to have starvation problems. That is, a large job can "starve" a small job which arrives even minutes later. Further, if the large job was a batch submission and the small job was an ad-hoc query, the exact completion time of the large job would not be particularly important, while the completion time of the small job would be.

This basic unfairness associated with FIFO scheduling motivated the FAIR scheduler, designed to be fair to jobs of various sizes. However, FAIR makes no direct attempt to optimize scheduling metrics such as, for example, maximum stretch or average response time. It is noted that schedules designed to optimize one metric will generally be quite different from those designed to optimize another.

The FLEX scheduler was designed to address this limitation of FAIR. However, a common scenario in MapReduce workloads involves multiple jobs arriving at close but distinct times and scanning the same dataset or datasets. There may be many of these common datasets, each associated with one or more of the jobs. In such a scenario, it is typical that most of the cost of the Map jobs can be traced to the scan of the data itself. This presents an opportunity for sharing scans of datasets. However, these existing approaches do not amortize the costs of the scans of common data by sharing them.

Other existing approaches for amortizing the sharing of scans can include finding batching by finding an optimal batching window per dataset. However, batching forces a tradeoff of efficiency for latency, which causes all but possibly the last scan arriving within a batching window to be delayed. Also, a larger batching window causes a longer average delay. Additionally, in such approaches, an assumption that the arrival rates of the jobs are known in advance is improper, as, at best, such an assumption will be a rough approximation, and may affect the quality of the optimization output. Further, the schedule produced by such approaches is inherently static, and therefore cannot react dynamically to changing conditions.

SUMMARY OF THE INVENTION

Principles and embodiments of the invention provide techniques for amortizing costs of shared scans. An exemplary method (which may be computer-implemented) for scheduling a plurality of jobs sharing input, according to one aspect of the invention, can include steps of partitioning one or more input datasets into multiple subcomponents, analyzing a plurality of jobs to determine which of the plurality of jobs require scanning of one or more common subcomponents of the one or more input datasets, and scheduling a plurality of jobs that require scanning of one or more common subcomponents of the one or more input datasets, facilitating a single scanning of the one or more common subcomponents to be used as input by each of the plurality of jobs.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 5 provides pseudo-code for the generalized Smith's Rule scheme, a component for average response time metrics and chain precedence constraints, according to an aspect of the invention;

FIG. 6 provides pseudo-code for the backwards dynamic program scheme, a component for minimax metrics and general precedence constraints, according to an aspect of the invention;

FIG. 7 provides pseudo-code for the ready-list malleable packing scheme, according to an aspect of the invention;

DETAILED DESCRIPTION OF EMBODIMENTS

Figure 1:
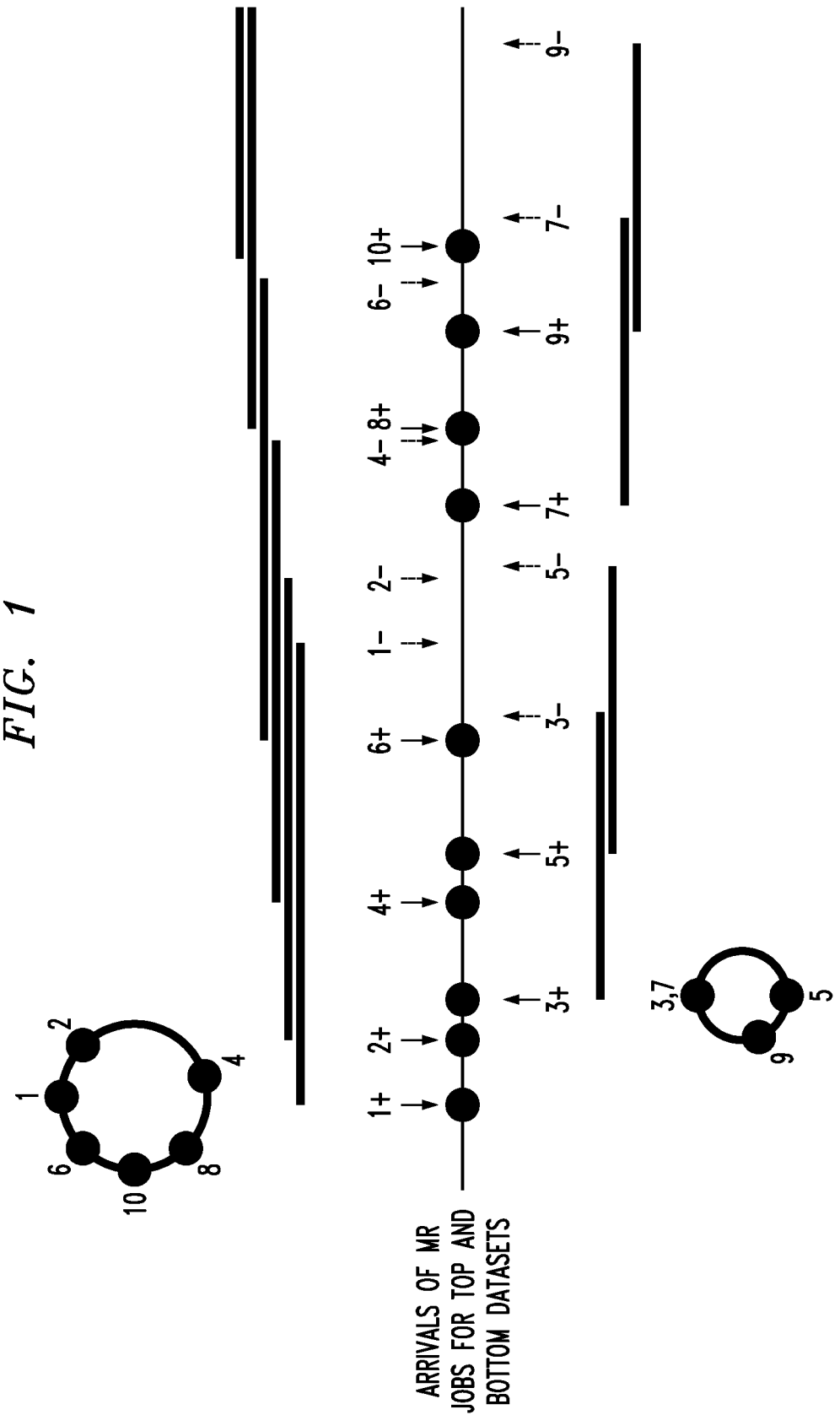
FIG. 1 illustrates cyclic piggybacking, according to an aspect of the invention.

Principles of the invention include amortizing costs and optimizing MapReduce jobs involving shared scans without incurring the tradeoffs associated with batching. Accordingly, one or more embodiments of the invention include sharing scans, amortizing their costs and providing optimized schedules in an environment such as, for example, MapReduce, including the steps of partitioning the datasets into multiple components, each to be shared by multiple sub-jobs, and scheduling these component sub-jobs on a plurality of processors in order to optimize a chosen metric. The techniques can include scheduling a plurality of jobs that arbitrarily share input datasets so that the overall data loading is efficient and cost effective. Datasets are partitioned into multiple subcomponents, each to be shared by multiple jobs and these subcomponent jobs are scheduled on a plurality of processors in order to optimize a chosen metric. MapReduce jobs are discussed herein merely as an example, and it should be appreciated by one skilled in the art that one or more embodiments of the invention are not limited to MapReduce.

As detailed, one or more embodiments of the invention can relate to the notion of multiple MapReduce jobs arriving at nearby but potentially distinct times and scanning the same dataset or datasets. For many MapReduce jobs, the cost of the Map phase is primarily that of scanning the data. As such, one or more embodiments of the invention relate to aspects of shared scans in the context of MapReduce jobs. For example, the techniques detailed herein include amortizing the cost of the shared scans of a set of multiple MapReduce jobs involving common datasets. Also, one or more embodiments of the invention include optimizing a job schedule with respect to any one of a user-specified choice of a multiplicity of standard metrics.

As described herein, one or more embodiments of the invention include partitioning a dataset, and then partitioning the jobs. Batching-related latency can be eliminated by employing a concept referred to herein as cyclic piggybacking. Because cyclic piggybacking essentially treats a dataset circularly rather than linearly, the advantages of amortization are achieved without the disadvantages of any latency. Additionally, Map jobs can begin immediately, and there is no need for Poisson assumptions. Further, in one or more embodiments of the invention, there is no need to have accurate job arrival rate data. The scheme is dynamic rather than static, and any of a large number of standard scheduling metrics can be optimized (such as, for example, average or maximum stretch, average response time, maximum number of tardy jobs, average or maximum tardiness, maximum lateness and service level agreement (SLA) costs). Such metrics can either be weighted or unweighted, as appropriately chosen by a user. The techniques detailed herein can, therefore, optimize for the sum or average of such metrics, or alternatively, for the maximum of all of them. (The former are called minisum metrics, and the latter minimax metrics.)

As detailed herein, one or more embodiments of the invention include a cyclic piggybacking portion as well as a scheduling manager portion. Cyclic piggybacking, rather than batching, provides a technique for amortizing the costs of shared scans. Jobs are decomposed into a number of sub-jobs, which are related by chain precedence constraints. A scheduling manager includes an enhanced FLEX. For example, a scheduling problem can look like an original FLEX scheduling problem except that there are now sub jobs instead of jobs, and the sub-jobs are to be scheduled (without loss of generality) in chain precedence order. Accordingly, one or more embodiments of the invention can solve many existing penalty function metrics (including, for example, all standard metrics, by modifying existing exact algorithms).

Additionally, the scheduling manager portion can include solving one of two optimization problems, depending on the metric chosen. By way of example, in one case, the optimization problem can be solved by a generalized Smith's Rule scheme. In another case, the optimization problem can be solved by a backwards dynamic programming scheme. Either of these schemes provides, as output, what is referred to as a priority order of the various sub-jobs, which can then be used as input by a ready-list malleable packing scheme. The output of this final component is an optimized malleable schedule for the chosen metric in the cyclic piggybacking environment.

As detailed herein, one or more embodiments of the invention also include solving problems in real-time, making use of more easily obtainable data (for example, estimates of arrival rates are not required). As such, the techniques described herein can relate to a situation, for example, when multiple computing jobs (that is, tasks) need to scan (that is, read) the same set of data D from an input source (for example, a disk), but the jobs are not received by the job scheduler at the same time. In other words, the scanning for a first job may be started at a time 1, and the second job may not become available until a time 2, after which the data scanning has begun for the first job.

Accordingly, in one or more embodiments of the invention, the second job will share the results of the scanning of data set D to the extent that there is a temporal overlap. In other words, if D is made up of subsets D1 to D5, and if when the second job comes in, D is in the process of being scanned for the new job such that D1 and D2 were already scanned, then going forward as D3-D5 are scanned, the results of that scanning are shared by both the new job and the second job. The new job will then have to wait until D1 and D2 are scanned again so they can be used as input to the new job. This assumes that once scanned, the data is not generally maintained in such a way that it can be used by future jobs without rescanning, which is probably so because it would take up too much room, even assuming there is a location where it can be stored in its scanned state.

In other example situations, the new job may share the scanning partially with a second job and partially with a third (or more) job. That is, some of the input data subsets that the new job needs may be needed by the second job, while others may be needed by the third job. Accordingly, in one or more embodiments of the invention, a new job can share the later part of a data set that is being scanned, and the new job can then scan the first part of that data at a later time.

As noted herein, one or more embodiments of the invention can relate, for example, to a MapReduce environment. MapReduce jobs include two processing phases. Each phase is broken into multiple independent tasks, the nature of which depends on the phase. In a Map phase, the tasks include the steps of scanning and processing (extracting information) from equal-sized blocks of input data. Each block is typically replicated on disks in three separate racks of hosts (in Hadoop, for example, using the hdfs file system). The output of the Map phase is a set of key-value pairs. These intermediate results can also be stored on a disk. Each of a Reduce phase tasks corresponds to a partitioned subset of the keys of the intermediate results. There can be a shuffle step in which all relevant data from all Map phase output is transmitted across the network, a sort step, and finally a processing step (which may include transformation, aggregation, filtering and/or summarization).

A MapReduce scheduler (such as that in Hadoop, for example) can be said to include two hierarchical algorithmic layers, which are referred to herein as the allocation layer and the assignment layer.

With respect to the allocation layer, each host is assumed to be capable of simultaneously handling some maximum number of Map phase tasks and some maximum number of Reduce phase tasks. These are the number of Map slots and Reduce slots, respectively. Aggregating these slots over all of the hosts in the cluster, the total number of Map slots can be computed, and similarly the total number of Reduce slots can be computed as well. The role of the allocation layer scheme includes partitioning the Map slots among the active Map jobs in some intelligent manner, and similarly the number of Reduce slots among the active Reduce jobs.

The assignment layer makes the actual job task assignment decisions, attempting to honor the allocation decisions made at the allocation level to the extent possible. Host components report any task completions at heartbeat epochs (on the order of a few seconds). Such completions free up slots, and also incrementally affect the number of slots currently assigned to the various jobs. The current slot assignment numbers for jobs are then subtracted from the job allocation goals. This yields an effective ordering of the jobs, from most relatively underallocated to most relatively overallocated. For each currently unassigned slot, the assignment model then finds an appropriate task from the most relatively underallocated job that has one, assigns it to the slot, and performs bookkeeping.

Accordingly, let S denote the total number of Map slots. Then, the FAIR allocation scheme is fair in the following sense: It computes, for each of J Map phase jobs j, a minimum number $m_j$ of Map slots. This minimum number is chosen so that the sum $\Sigma_{j=1}^{J} m_j \leq S$. The minima can be normalized if necessary. This minimum number $m_j$ acts as a fairness guarantee, because FAIR will always allocate a number of Map slots $s_j \geq m_j$, thereby preventing job starvation. Slack (the difference $S-\Sigma_{j=1}^{J} m_j$) is allocated in FAIR according to a waterline-based scheme (which also emphasizes fairness). Analogous statements hold for the Reduce phase. Additionally, the FLEX allocation scheme is fair in this sense as well.

One or more embodiments of the invention focus on jobs in their Map phase, and will also be fair. For example, such embodiments can work in an environment in which many jobs arriving at relatively close times must scan the same dataset or datasets. However, those skilled in the art will recognize that the invention will work entirely satisfactorily if all jobs scan separate datasets. In particular, such a scenario will not cause any significant additional overheads relative to the original MapReduce scheduling paradigm.

As noted above, the techniques detailed herein include a notion referred to as cyclic piggybacking. FIG. 1 illustrates cyclic piggybacking, according to an aspect of the invention. In the example illustrated, there are ten total jobs, and each job must scan one of two datasets. There are six jobs (that is, 1, 2, 4, 6, 8 and 10) scanning the first dataset and four jobs (that is, 3, 5, 7 and 9) scanning the second dataset. The first dataset and all jobs associated with it are noted on the top portion of the figure. Similarly, the second dataset and all jobs associated with it are noted on the bottom portion of the figure. Also, consider the (middle) time line at the center of the figure, where time proceeds from left to right.

If the dataset is thought of for example, as an ordered list of blocks, the dataset can be viewed linearly. Also, for example, blocks can be thought of as being scanned in this line segment from left to right, from first block to last block. However, recognizing that there is no special meaning to the first or last blocks, these two blocks can also be glued together and the dataset can be viewed cyclically. An analogy here could be a clock, with blocks corresponding to hours. Blocks can be scanned in a clockwise manner, starting with the first block, and as the scan reaches the last block it can begin again at the first block. In the figure, the top-most point of a circle will indicate the boundary between the first and last block. In the clock analogy, this point is simply midnight.

At time 1, the first (top) job arrives. It is illustrated both via the linear time line and in a cyclic view of the red dataset shown at the top. (A plus sign will henceforth indicate a job arrival, while a minus sign will refer to a job departure.) The (top) Map job 1 starts to scan data in clockwise fashion from the midnight starting point denoted by 1. The (aligned) linear view of job 1 is shown above the timeline.

Subsequently, a second (top) job arrives at time 2. Again, this arrival is shown in both the linear and cyclic views. Considering the cyclic view, the clockwise arc from point 1 to point 2 involves previously scanned blocks, but job 2 can now piggyback its data scan of subsequent common data onto the remaining scan of job 1, amortizing costs. In the linear view, notice that the "amortization concurrency level" once job 2 starts is increased to 2.

The subsequent arrival of a third (bottom) job causes the cyclic view of the bottom dataset, and the aligned linear view of job 3 below the timeline.

As illustrated, this process continues. The arrival of (top) job 4 causes a concurrency level of 3 for the top dataset. The arrival of (bottom) job 5 causes a concurrency level of 2 for the bottom dataset. The arrival of (top) job 6 causes a concurrency level of 4 for the top dataset. Then, the departure of job 3 occurs, reducing the concurrency level back to 1 for the bottom dataset. Note that the eventual departure of (bottom) job 5 and the subsequent arrival of (bottom) job 7 causes a new single scan of the first blocks of the bottom dataset again, and so forth.

Defined in this manner, cyclic piggybacking prevents the latency associated with batching, because jobs can start instantly. The arrival distribution and rates are irrelevant, as the design simply reacts dynamically.

In some instances, the block scan execution order can depend on the assignment layer, and therefore on affinity issues such as data locality to the node with an available slot. In one or more embodiments of the invention there can be a bit for each job and relevant block, which notes whether or not that block has already been scanned by the job.

As also described herein, one or more embodiments of the invention include chain precedence scheduling. By way of example, this can be understood as an epoch-based malleable scheduling problem for sub-jobs related by chain precedence. The precise formulation of the problem will depend on the metrics (or penalty functions) chosen by the user, whether or not they are weighted, and the form (minisum or minimax) of the objective function.

With respect to the creation of chain precedence sub-jobs, suppose that there are $K_j$ jobs scanning a particular dataset j at a particular instant in time. Cyclic piggybacking has the effect of partitioning the dataset j into $K_j+1$ disjoint sets of blocks. The first set will be relevant to all $K_j$ jobs. The second set will (still) be relevant to $K_j-1$ jobs, all but the first to arrive. The third set will still be relevant to $K_j-2$ jobs, all but the first two to arrive. Continuing in this nested manner, the $K_j$th subset will still be relevant to 1 job, the last to arrive. The $(K_j+1)$st subset, which will be empty if and only if the last job has just arrived, will no longer be relevant. It is expected that the large majority of the work in a Map job involves the dataset scan, and so, by abuse of notation, the Map jobs will be labeled by their scan dataset. Therefore, under cyclic piggybacking, the set of all Map work associated with the dataset j can be considered instead as $K_j$ sub-jobs, which are denoted $\{(j, 1), \ldots, (j, K_j)\}$. Specifically, sub-job (j, k) can be labeled as the one which is relevant to $K_j-k+1$ original jobs.

As detailed herein, in one or more embodiments of the invention, the sub-jobs associated with each dataset j can be assumed to be related by chain precedence. In other words, (j, 1) ≺ (j, 2) ≺ ... ≺ (j, $K_j$−1) ≺ (j, $K_j$). By way of illustration, no actual job can complete until all of the blocks associated with its dataset have been scanned. Also, all of the possible scheduling metrics are functions of this completion time. If $1 \leq k_1 < k_2 \leq K_j$, it can help but cannot hurt the scheduling objective function to perform the scan of a block in sub-job (j, $k_1$) before performing the scan of a block in sub-job (j, $k_2$). This is because all of the original jobs which are relevant to sub-job (j, $k_2$) are also relevant to sub-job (j, $k_1$).

Figure 2:
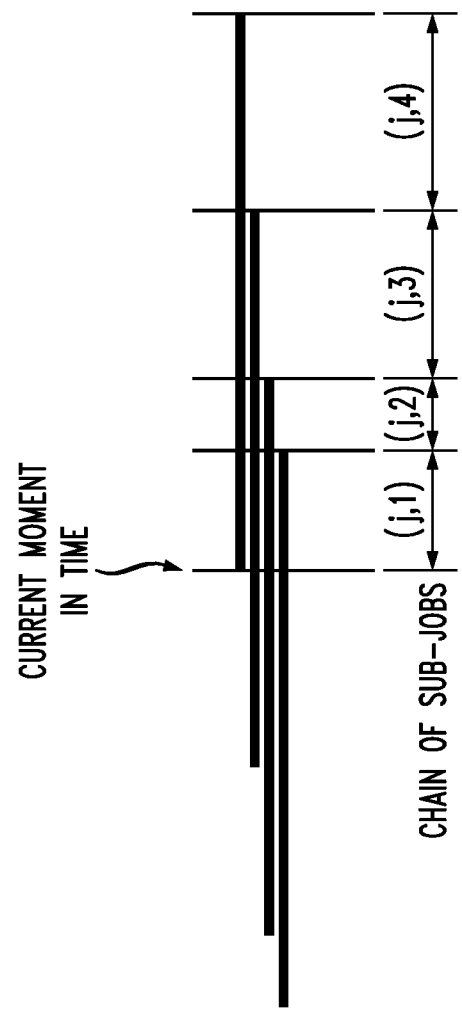
FIG. 2 illustrates the creation of sub-jobs for each Map job, these sub-jobs being in chain precedence order, according to an aspect of the invention.

FIG. 2 illustrates the creation of sub-jobs for each Map job, these sub-jobs being in chain precedence order, according to an aspect of the invention. FIG. 2 illustrates the decomposition into sub-jobs with chain precedence, using the top job j example provided in FIG. 1. In FIG. 2, the current moment in time is precisely at the arrival of job 6, which is the fourth top job in FIG. 1. Portions of the scans of the first three jobs have already occurred. There will now be 4 sub-jobs, (j, 1), ..., (j, 4), none of which have yet begun. In the absence of subsequent (top) job arrivals, the four sub-jobs will have successively lower concurrency levels (from 4 down to 1). The sub-jobs are related by chain precedence: (j, 1) ≺ (j, 2) ≺ (j, 3) ≺ (j, 4).

The solution to the allocation layer scheduling problem will depend on the choice of metric made by the user. These metrics are called penalty functions.

Figure 3:
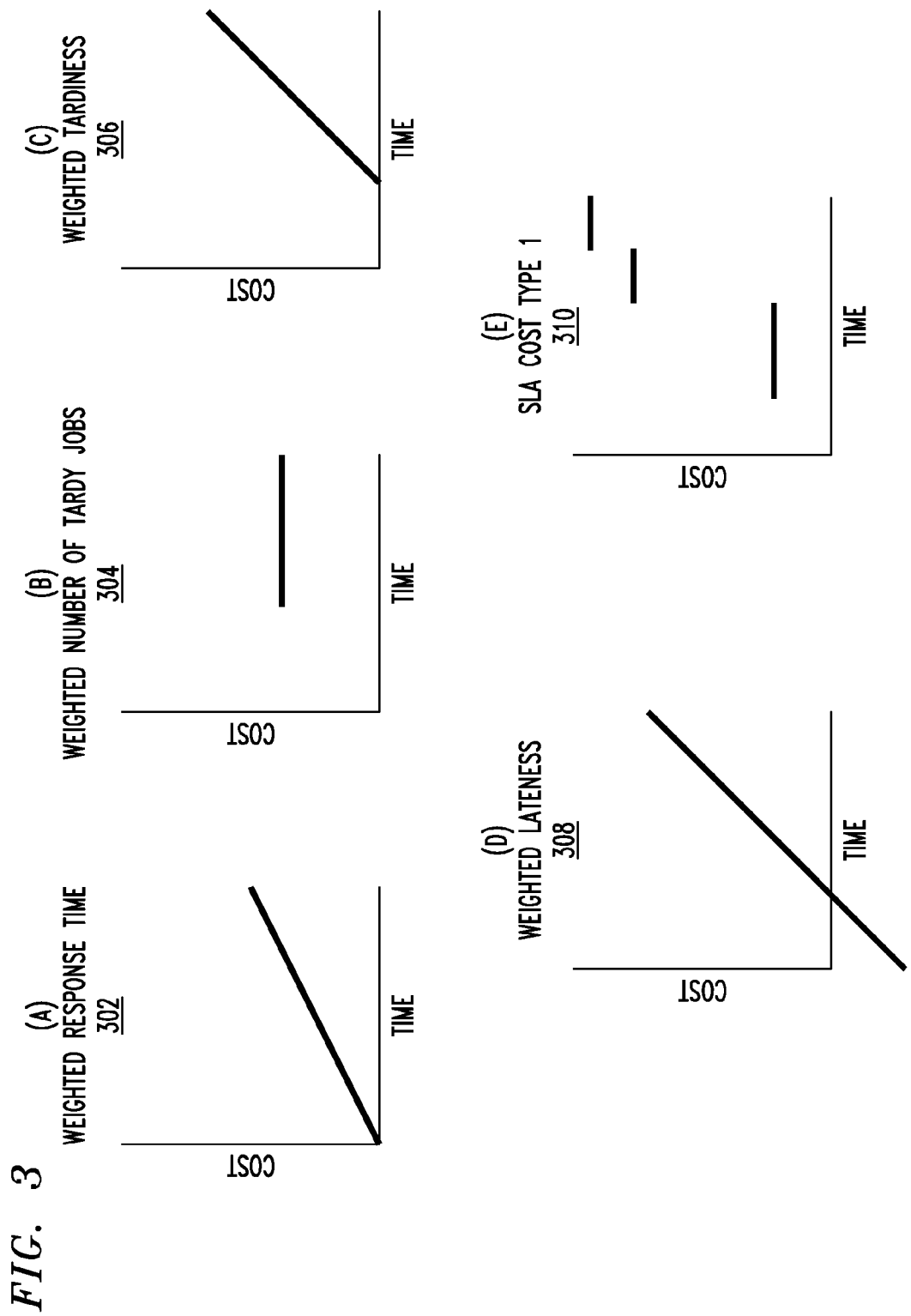
FIG. 3 illustrates five scheduling metrics, according to an aspect of the invention.

By way of illustration, think of each job as having a penalty function metric that measures the cost of completing that job at a particular time. FIG. 3 illustrates five scheduling metrics, according to an aspect of the invention. Each of the five subfigures in FIG. 3 (that is, graph 302 depicting weighted response time, graph 304 depicting weighted number of tardy jobs, graph 306 depicting weighted tardiness, graph 308 depicting weighted lateness and graph 310 depicting SLA costs) describe the form of a particular per job penalty function. The X-axis represents the completion time of that job, while the Y-axis represents the penalty. It should be pointed out that there can still be many potential problem variants. These combinatorial alternatives involve, for example, whether or not to incorporate non-unit weights into the penalty functions. (In some cases, specific weight choices will have special meanings. In other cases, they are used basically to define the relative importance of each job.) Also, it can generally make sense either to minimize the sum of all of the per job penalty functions, or to minimize the maximum of all of the per job penalty functions. The former case is referred to as a minisum problem, and the latter case as a minimax problem. The five penalty function categories, as detailed below, include response time, number of tardy jobs, tardiness, lateness and SLA costs.

Response time, the metric illustrated in graph 302, is likely the most commonly employed in computer science. (The weight is the slope of the linear function.) Three examples include the following. Solving the minisum problem would minimize either the average response time or the weighted average response time of all of the jobs. In the unweighted case, the minimax problem would be used to minimize the makespan of the jobs. This is the completion time of the last job to finish, and is appropriate for optimizing batch work. Suppose the work (or time required to perform job j in isolation) is $W_j$. Then the completion time of a job divided by $W_j$ is known as the stretch of the job, a measure of how delayed the job will be by having to share the system resources with other jobs. Thus, solving a minisum problem while employing weights $1/W_j$ will minimize the average stretch of the jobs. Similarly, solving a minimax problem while employing weights $1/W_j$ will minimize the maximum stretch. Either of these can be used as a fairness measure.

With respect to the number of tardy jobs, each job j has a deadline, say $d_j$. In this case, only the minisum problem is appropriate. The weight is the height of the step in graph 304. The unweighted case counts the number of jobs that miss their deadlines.

With respect to tardiness, again, each job j has a deadline $d_j$. The tardiness metric generalizes the response time metric, which can be said to employ deadlines at time 0. Only tardy jobs are charged, and the slope of the non-flat line segment in graph 306 is the weight. It makes sense to speak of either minisum or minimax tardiness problems, both either weighted or unweighted.

With respect to lateness, once again, each job j has a deadline $d_j$. The lateness metric generalizes response time also, with the same explanation as that of tardiness above. As before, the weight is the slope of the line. Note that early jobs are actually rewarded rather than penalized, making this the only potentially negative metric. The minisum variant differs from the response time metric by an additive constant, and thus can be solved in exactly the same manner as that problem. But the minimax problem is legitimately interesting in its own right. See, for example, graph 308.

With respect to SLA costs, in this metric, each job j has potentially multiple pseudo-deadlines $d_{i,j}$ which increase with i. The penalties $p_{i,j}$ increase with i as well. This yields the metric of graph 310, which includes a step function for each job, a generalization of the weighted number of tardy jobs metric. As in that case, only the minisum problem is appropriate. This metric can be thought of as the total cost charged to the provider based on a pre-negotiated SLA contract.

From a scheduling perspective, a key feature of the Map phase of a MapReduce job is that it is parallelizable. It includes many atomic tasks which are effectively independent of each other and therefore can be performed on a relatively arbitrary number of (multiple slots in) multiple hosts simultaneously. If a given job is allocated more of these slots, it will complete in less time. These atomic tasks correspond to the blocks. One or more embodiments of the invention include taking advantage of this additional structure inherent in the MapReduce paradigm.

A schedule can be built in which each Map job is assigned a fixed allocation of slots for the duration of the job. This is referred to as moldable scheduling. Malleable scheduling is more general: Instead of making a static decision about the per job slot allocations, one can proceed in multiple intervals. Different intervals can involve different allocations of slots. Each interval then contributes a portion of the total work required to perform the job. Also, this can be done in the context of precedence constraints as well.

Figure 4:
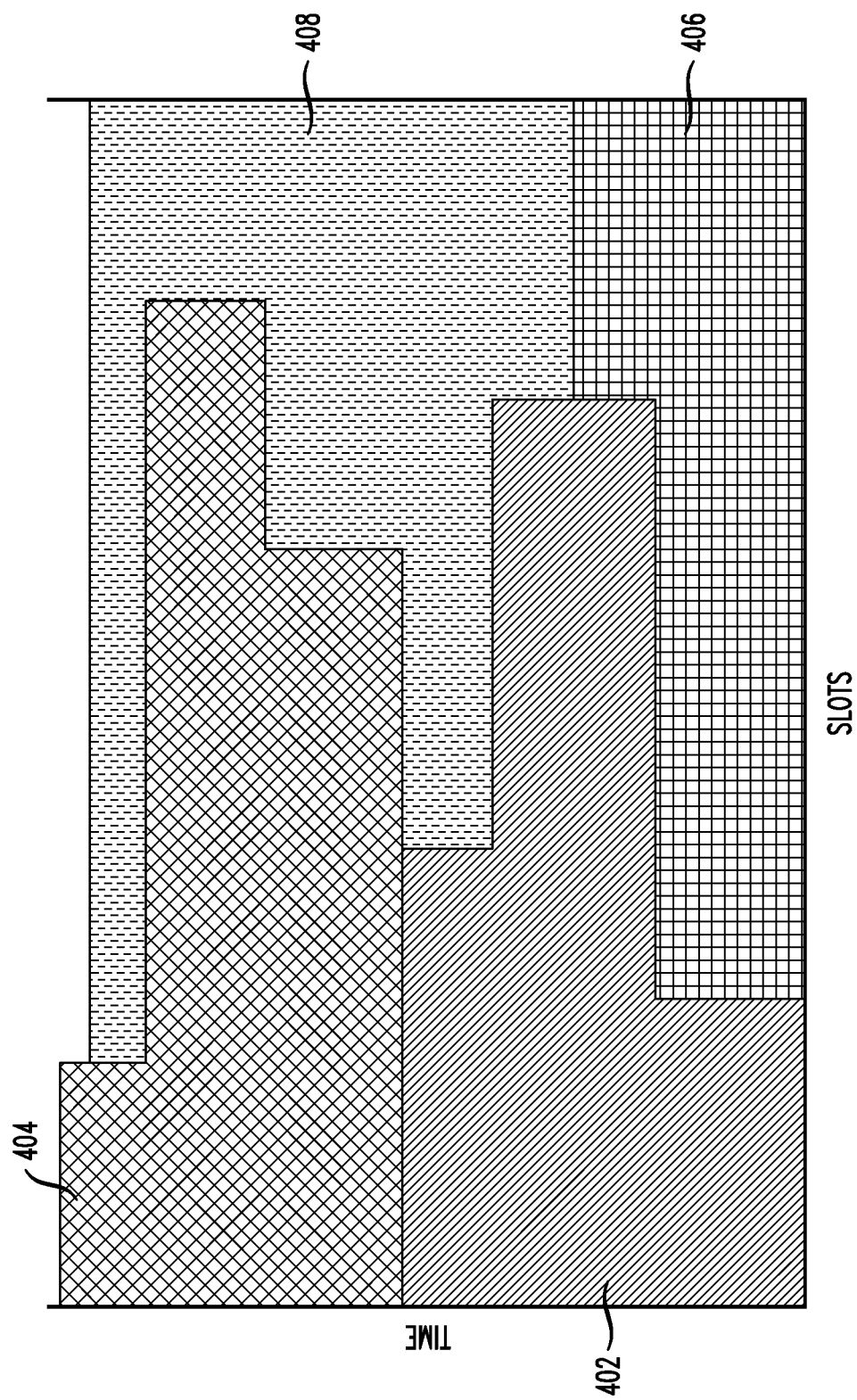
FIG. 4 illustrates a malleable schedule with chain precedence constraints, according to an aspect of the invention.

FIG. 4 illustrates a malleable schedule with chain precedence constraints, according to an aspect of the invention. By way of illustration, FIG. 4 illustrates a potential malleable schedule of four jobs (that is, jobs 402, 404, 406 and 408). Jobs 402 and 404 are related by precedence constraints, as are jobs 406 and 408. (In this example, there are two precedence chains.)

As detailed herein, one or more embodiments of the invention can include an example of an epoch-based allocation scheduler. This means that time is partitioned into epochs of some fixed length T. As such, if time starts at t=0, the epochs will start at times 0, T, 2T, 3T and so on. The scheduler will produce allocations that will be in effect for one epoch, so that the eth epoch allocations will be honored from time eT to time (e+1)T. Accordingly, the work for the eth epoch must be completed by the start time eT of that epoch.

One or more embodiments of the invention include receiving input describing the total number of Map slots in a system, the number of active Map jobs, the minimum and maximum number of slots per active Map job, the precedence constraints and estimates of the remaining processing times required for each of the active Map jobs. Then, the algorithm outputs high quality allocations of slots to these jobs. These allocations may be time-dependent in the sense that there may be several consecutive intervals, say I, of different allocation levels. This represents the notion of malleability.

By way of illustration, consider the eth epoch. The output will take the form $(s_{1,1}, \ldots, s_{1,J}, T_0, T_1), \ldots, (s_{I,1}, \ldots, s_{I,J}, T_{I-1}, T_I)$, where $T_0$=eT, the ith interval is the time between $T_{i-1}$ and $T_i$, and $s_{i,j}$ represents the number of slots allocated to job j in interval i. Allocations for the eth epoch will likely extend beyond the start time of the (e+1)st epoch. That is, it is expected that $T_I$>(e+1)T. However, any of these allocation decisions will be superseded by the decisions of newer epochs. In fact, it is expected that the completion time of even the first of the consecutive intervals in the eth epoch will typically exceed the length of an epoch, so that $T_1$>(e+1)T. This means that, generally, only the first interval in the output of one or more embodiments of the invention will actually be enforced by the assignment model during each epoch.

An advantage of an epoch-based scheme is its resilience to inaccuracies in input data that might arise from a heterogeneous cluster environment. Epoch by epoch, one or more embodiments of the invention can automatically correct its solution in light of better estimates and system state changes.

The problem formulation for a portion of one or more embodiments of the invention can consequently be summarized, for example, as follows: Epoch by epoch, consider a set of jobs, subsets of which are subject to chain precedence constraints, and all of which have minimum and maximum slot constraints. Solve a malleable scheduling problem which minimizes either the sum or the maximum of one of the metrics, either weighted or unweighted. Output the interval-by-interval slot allocations.

One or more embodiments of the invention can include solving this problem in two steps. The first step will be used to find a topological ordering of the jobs. (A topological order is an ordering of the jobs which respects the precedence among the jobs. Thus $j_1$<$j_2$ whenever $j_1$ ≺ $j_2$). The second step will employ this ordering using a ready-list malleable packing scheme. (A ready-list is a dynamically maintained list of jobs which are ready to run at any given time. In other words, all precedence constraints must have been satisfied at the time.)

In finding a high-quality priority ordering, the objective is to find a topological ordering L on jobs to input to the ready-list malleable packing scheme. One of two schemes can be employed, depending on problem variant. Either will produce an interim (hypothetical) schedule, and the completion times of the jobs in this interim schedule will determine the input ordering to the ready-list malleable packing scheme.

There are two cases: Case A involves the minisum problem of minimizing the weighted average response time, and case B involves any minimax problem.

Case A can be solved by a generalized version of Smith's Rule. FIG. 5 provides pseudo-code for the generalized Smith's Rule scheme, a component for average response time metrics and chain precedence constraints, according to an aspect of the invention. The schedule created in the pseudo-code automatically provides a priority ordering of completion times, which will be input to the subsequent step.

Case B can be solved by a backwards dynamic program. FIG. 6 provides pseudo-code for the backwards dynamic program scheme, a component for minimax metrics and precedence constraints, according to an aspect of the invention. This scheme works for any non-decreasing penalty function $F_j$ and any precedence relation ≺: The special case of chain precedence is not essential. Again, the schedule created in the pseudo-code automatically provides a priority ordering of completion times, which will be input to the subsequent step.

The noted subsequent step includes a ready-list malleable packing scheme. FIG. 7 provides pseudo-code for the ready-list malleable packing scheme, according to an aspect of the invention. Given a priority ordering, the scheme proceeds iteratively. At any iteration, a current list L of jobs is maintained, ordered by priority. Time is initialized to $T_0$=0. The current list L is initialized to be all of the jobs, and one job is removed from L at the completion time $T_i$ of each iteration i. The time interval during iteration i (from time $T_{i-1}$ to $T_i$) can be considered an interval. The number of slots allocated to a given job may vary from interval to interval, thus producing a malleable schedule.

The ith iteration of the algorithm can involve the following steps: First, the scheme allocates the minimum number of slots to each job j∈L. This is feasible because the minima have been normalized, if necessary, during a pre-computation step. After allocating these minima, some slack may remain. This slack can be computed as $s=S-\Sigma_{j\in L}m_j$. The idea is to allocate the remaining allowable slots $M_j-m_j$ to the jobs j in priority order. The first several may get their full allocations, and those jobs will be allocated their maximum number of slots, namely $M_j=m_j+(M_j-m_j)$. But ultimately, all S slots may get allocated in this manner, leaving at most one job with a partial remaining allocation of slots, and all jobs having lower priority with only their original, minimum number of slots. (The formal details of these steps are given in the noted pseudo-code.) Given this set of job allocations, one of the jobs j will complete first, at time $T_i$. (Ties among jobs may be adjudicated in priority order.) Accordingly, job j is removed from L, and the necessary bookkeeping is performed to compute the remaining work past time $T_i$ for those jobs remaining in L. After J iterations (and J intervals), the list L will be depleted and the malleable schedule created.

Figure 8:
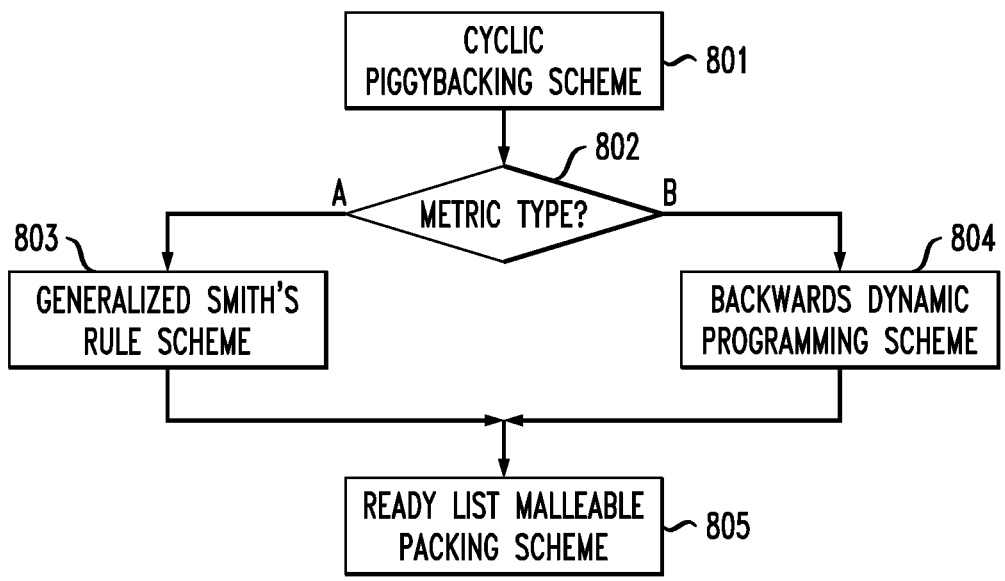
FIG. 8 provides a flow chart of components according to an aspect of the invention.

FIG. 8 provides a flow chart of components according to an aspect of the invention. In step 801, the cyclic piggybacking scheme provides a collection of sub-jobs related by chain precedence. Step 802 includes partitioning the scheduling problem into two cases: case A and case B. Case A is appropriate for weighted average response time metrics. This is handled by the generalized Smith's Rule scheme in step 803. Case B is appropriate for minimax metrics. This is handled by the backwards dynamic programming scheme in step 804. In either case, the next step is step 805, which includes the ready-list malleable packing scheme.

Figure 9:
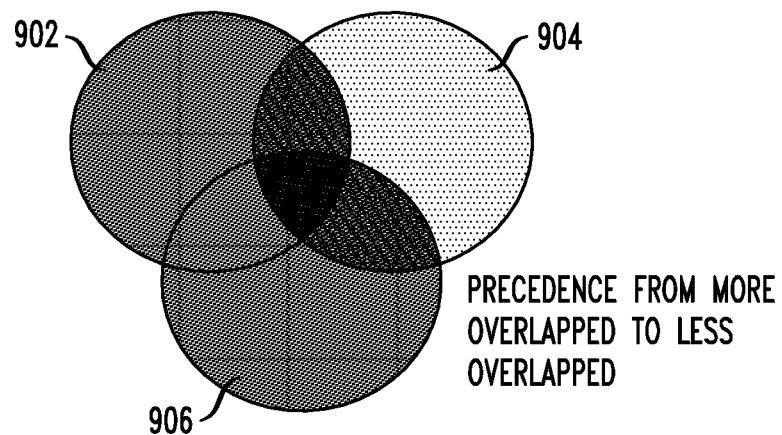
FIG. 9 provides a Venn diagram appropriate for the notion of semi-shared scans, according to an aspect of the invention.

Those skilled in the art will appreciate that, at least for minimax objective functions, one or more embodiments of the invention can also be implemented in a more general case. Consider FIG. 9, which provides a Venn diagram appropriate for the notion of semi-shared scans, according to an aspect of the invention. Semi-shared scans can include different jobs read arbitrarily overlapping datasets within one or more directories. A schedule will have to automatically handle shared scanning and optimization of scheduling metrics. FIG. 9 depicts shows a Venn diagram of semi-shared scans for three jobs (that is, job 902, job 904 and job 906) in the case where these jobs scan arbitrarily overlapping datasets, perhaps within one or more directories. Such a scenario could happen quite naturally, for example, if one job scans a week of data, another scans a month and a third scans a season. Note that weeks do not necessarily fit within a single month or season, and months do not necessarily fit within a single season, so this example is not nested, and sufficiently general to illustrate the concept in the figure.

There is a natural partitioning of the union of the datasets based on the overlapping sets in the Venn diagram. In FIG. 9, there are six such components. Accordingly, there is a natural precedence order among the components, from more overlapped to less overlapped. This is not a chain precedence scenario, but those skilled in the art will recognize that one or more embodiments of the invention can be naturally extended in the case of minimax objective functions. This is because both the backwards dynamic programming scheme and the ready-list malleable packing scheme work for general precedence constraints.

Figure 10:
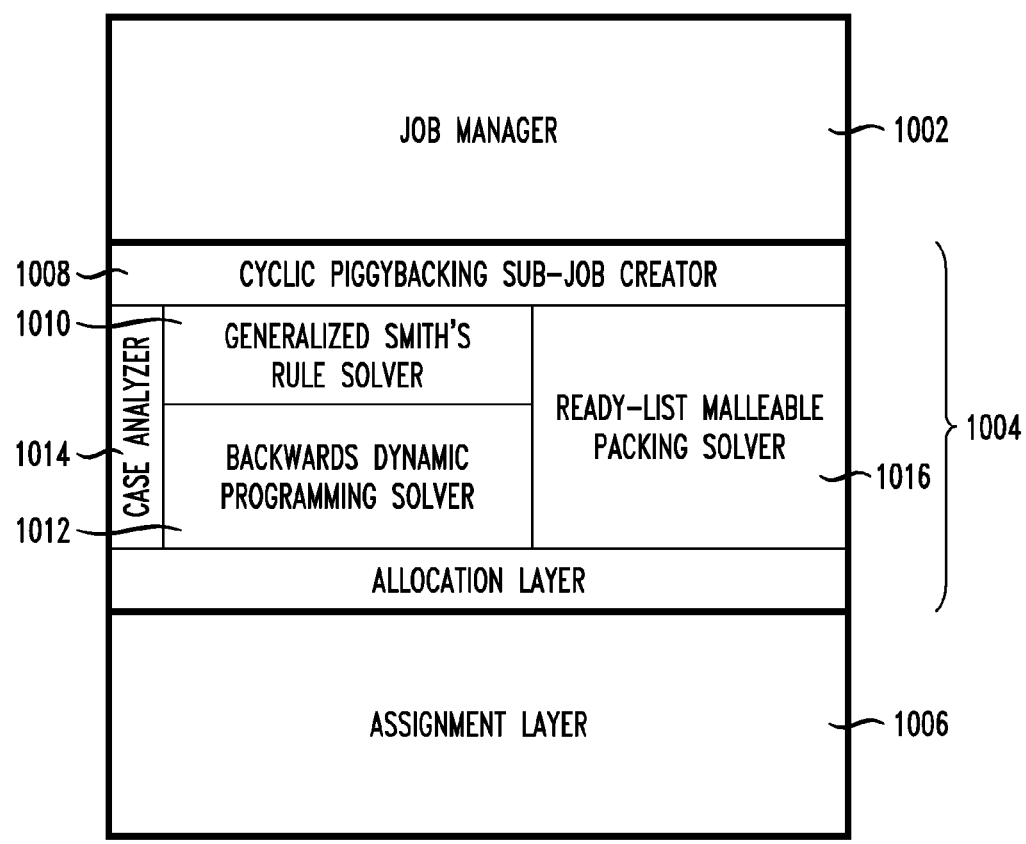
FIG. 10 is a block diagram illustrating an example embodiment, according to an aspect of the invention.

FIG. 10 is a block diagram illustrating an example embodiment, according to an aspect of the invention. Component 1002 is the job manager for the MapReduce cluster, which is responsible for admitting new jobs, discarding completed or stopped jobs, and maintaining the input information for the current jobs. Component 1004 is the allocation layer and includes the scheduling components of one or more embodiments of the invention. This includes a cyclic piggybacking sub-jobs creator component 1008, a case analyzer module 1014 based on the metric, two specialized solvers for the two cases described herein (that is, a generalized Smith's Rule solver component 1010 and a backwards dynamic programming solver component 1012), and a ready-list malleable packing solver component 1016. Actual assignments of blocks to newly free slots are carried out via an assignment layer component 1006.

Figure 11:
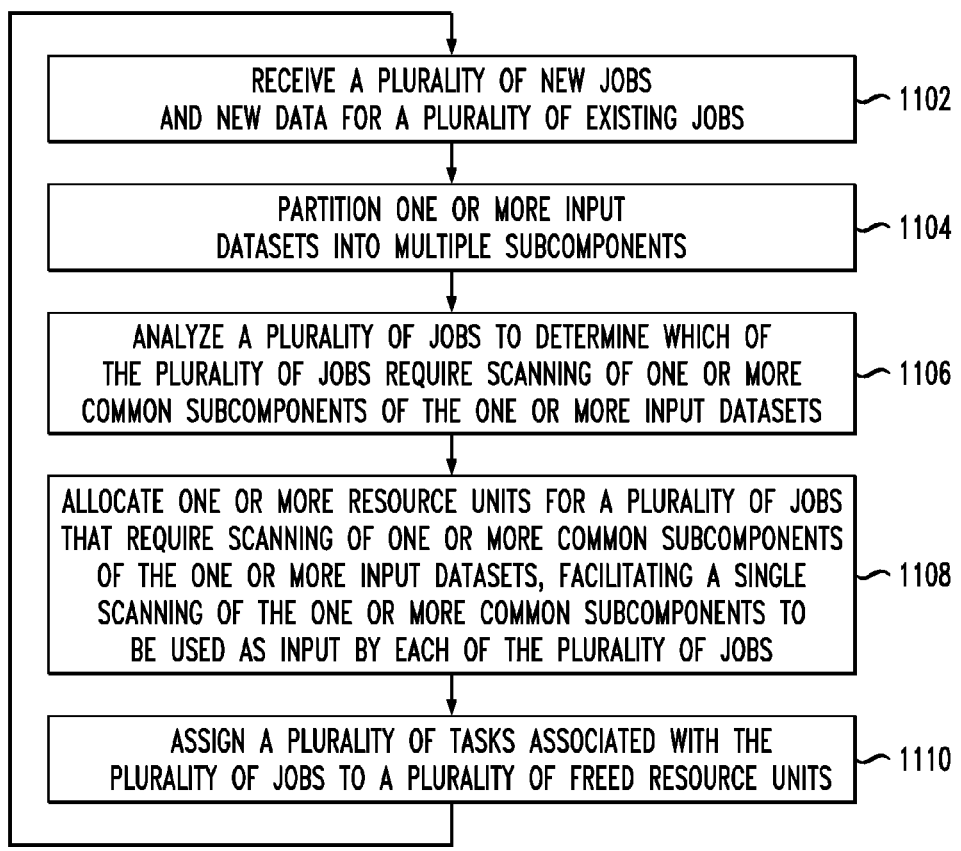
FIG. 11 is a flow diagram illustrating techniques for scheduling a plurality of jobs sharing input, according to an embodiment of the invention.

FIG. 11 is a flow diagram illustrating techniques for scheduling a plurality of jobs sharing input, according to an embodiment of the present invention. Step 1102 includes receiving a plurality of new jobs and new data for a plurality of existing jobs. This step can be carried out, for example, using a job manager component (for example, component 1002 in FIG. 10). Additionally, one or more embodiments of the invention can include discarding a plurality of existing jobs that have either completed or been stopped in conjunction with this step.

Step 1104 includes partitioning one or more input datasets into multiple subcomponents (for example, each to be shared by multiple jobs). This step can be carried out, for example, using an allocation layer component (for example, component 1004 in FIG. 10).

Step 1106 includes analyzing a plurality of jobs to determine which of the plurality of jobs require scanning of one or more common subcomponents of the one or more input datasets. This step can be carried out, for example, using an allocation layer component (for example, component 1004 in FIG. 10). Analyzing a plurality of jobs to determine which of the plurality of jobs require scanning of common subcomponents of the input datasets can include determining whether a common subcomponent of a dataset has previously been scanned (via, for example, a job schedule) as input data for a previously scheduled job and, if so, scheduling a subsequent job to share as input data the scanned subcomponent that was scheduled for the previously scheduled job.

As detailed herein, in one or more embodiments of the invention, the plurality of jobs can be subject to one or more fairness constraints in a resource constrained environment, and the plurality of jobs can also include a plurality of jobs in a MapReduce environment.

Step 1108 includes allocating one or more resource units (for example, slots) for a plurality of jobs that require (for example, arbitrarily require) scanning of one or more common subcomponents of the one or more input datasets, facilitating a single scanning of the one or more common subcomponents to be used as input by each of the plurality of jobs. This step can be carried out, for example, using an allocation layer component (for example, component 1004 in FIG. 10). Allocating one or more resource units for a plurality of jobs that require scanning of common subcomponents of the input datasets can include allocating one or more resource units for a plurality of jobs wherein the plurality of jobs are not received (for example, by the job scheduler) simultaneously. Allocating one or more resource units for a plurality of jobs when the plurality of jobs are not received simultaneously includes facilitating a newly-received job to share results of a scanning of common subcomponents with one or more previously-received jobs to an extent that there is a temporal overlap.

Also, allocating one or more resource units for a plurality of jobs that require scanning of common subcomponents of the input datasets can include allocating one or more resource units for a plurality of jobs on a plurality of processors to optimize a metric (for example, a metric chosen by a user).

Step 1110 includes assigning a plurality of tasks (for example, blocks) associated with the plurality of jobs to a plurality of (newly) freed resource units. This step can be carried out, for example, using an assignment layer (for example, component 1006 in FIG. 10).

The techniques depicted in FIG. 11 can also include receiving (for example, at a job scheduler) a new job that requires scanning (that is, reading or loading) of an input dataset (D), wherein the input dataset (D) comprises one or more (x) subcomponents (D1 to Dx). Additionally, one or more embodiments of the invention can include scanning one or more subcomponents of the input datasets that are not in a common dataset at a time subsequent to scanning of the common subcomponents.

Further, the techniques depicted in FIG. 11 can include portioning the plurality of jobs into a plurality of sub-jobs, wherein one or more sub-jobs of a job sharing scanning of one or more subcomponents with one or more sub-jobs of one or more additional jobs can be scheduled, and remaining sub-jobs of the job wait to be scheduled. Additionally, in one or more embodiments of the invention, the steps depicted in FIG. 11 can be repeated.

The techniques depicted in FIG. 11 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a job manager module, an allocation layer module, and an assignment layer module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 11 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 12:
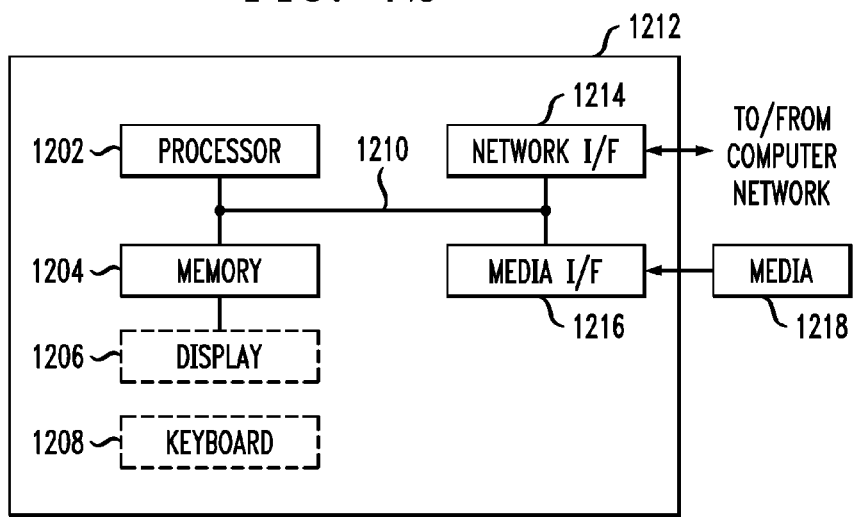
FIG. 12 is a system diagram of an exemplary computer system on which at least one embodiment of the invention can be implemented.

One or more embodiments can make use of software running on a general purpose computer or workstation. With reference to FIG. 12, such an implementation might employ, for example, a processor 1202, a memory 1204, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1202 coupled directly or indirectly to memory elements 1204 through a system bus 1210. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1212 as shown in FIG. 12) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1218 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 10. The method steps can then be carried out using the distinct software modules and/or sub-modules of the system, as described above, executing on one or more hardware processors 1202. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, amortizing the cost of the shared scans of a set of multiple MapReduce jobs involving common datasets.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for scheduling a plurality of jobs sharing input, wherein the method comprises:

partitioning one or more input datasets into multiple sub-components;

analyzing a plurality of jobs to determine which of the plurality of jobs require scanning of one or more common subcomponents of the one or more input datasets; and scheduling a plurality of jobs that require scanning of one or more common subcomponents of the one or more input datasets, facilitating a single scanning of the one or more common subcomponents to be used as input by each of the plurality of jobs, wherein said scheduling comprises scheduling one or more of the plurality of jobs to share as input data a previously scanned common subcomponent scheduled for a previously scheduled job.

2. The method of claim 1, further comprising receiving a new job that requires scanning of an input dataset, wherein the input dataset comprises one or more subcomponents.

3. The method of claim 1, wherein scheduling a plurality of jobs that require scanning of one or more common subcomponents of the one or more input datasets comprises scheduling a plurality of jobs, wherein the plurality of jobs is not received simultaneously.

4. The method of claim 3, wherein scheduling a plurality of jobs when the plurality of jobs are not received simultaneously comprises facilitating a newly received job to share results of a scanning of common subcomponents with one or more previously received jobs to an extent that there is a temporal overlap.

5. The method of claim 1, wherein scheduling the plurality of jobs that require scanning of one or more common subcomponents of the one or more input datasets comprises scheduling the plurality of jobs on a plurality of processors to optimize a metric.

6. The method of claim 5, wherein the metric is chosen by a user.

7. The method of claim 1, wherein the plurality of jobs is subject to one or more fairness constraints in a resource-constrained environment.

8. The method of claim 1, wherein the plurality of jobs comprise a plurality of jobs in a MapReduce environment.

9. The method of claim 1, further comprising scanning one or more subcomponents of the one or more input datasets that are not in a common dataset at a time subsequent to scanning of the one or more common subcomponents.

10. The method of claim 1, further comprising portioning the plurality of jobs into a plurality of sub-jobs, wherein one or more sub-jobs of a job sharing scanning of one or more subcomponents with one or more sub-jobs of one or more additional jobs can be scheduled, and remaining sub-jobs of the job wait to be scheduled.

11. The method of claim 1, further comprising providing a system, wherein the system comprises one or more distinct software modules, each of the one or more distinct software modules being embodied on a tangible computer-readable recordable storage medium, and wherein the one or more distinct software modules comprise a job manager module, an allocation layer module and an assignment layer module executing on a hardware processor.

12. A computer program product comprising a tangible computer-readable recordable storage medium including computer-useable program code for scheduling a plurality of jobs sharing input, the computer program product including:

computer-useable program code for partitioning one or more input datasets into multiple subcomponents;

computer-useable program code for analyzing a plurality of jobs to determine which of the plurality of jobs require scanning of one or more common subcomponents of the one or more input datasets; and computer-useable program code for scheduling a plurality of jobs that require scanning of one or more common subcomponents of the one or more input datasets, facilitating a single scanning of the one or more common subcomponents to be used as input by each of the plurality of jobs, wherein said scheduling comprises scheduling one or more of the plurality of jobs to share as input data a previously scanned common subcomponent scheduled for a previously scheduled job.

13. The computer program product of claim 12, wherein the computer-useable program code for scheduling a plurality of jobs that require scanning of one or more common subcomponents of the one or more input datasets comprises computer useable program code for scheduling a plurality of jobs, wherein the plurality of jobs is not received simultaneously.

14. The computer program product of claim 13, wherein the computer-useable program code for scheduling a plurality of jobs when the plurality of jobs are not received simultaneously comprises computer useable program code for facilitating a newly received job to share results of a scanning of common subcomponents with one or more previously received jobs to an extent that there is a temporal overlap.

15. The computer program product of claim 12, wherein the plurality of jobs comprise a plurality of jobs in a MapReduce environment.

16. The computer program product of claim 12, further comprising computer-useable program code for portioning the plurality of jobs into a plurality of sub-jobs, wherein one or more sub-jobs of a job sharing scanning of one or more subcomponents with one or more sub-jobs of one or more additional jobs can be scheduled, and remaining sub-jobs of the job wait to be scheduled.

17. A system for scheduling a plurality of jobs sharing input, comprising:

a memory; and at least one processor coupled to the memory and operative to:

partition one or more input datasets into multiple subcomponents;

analyze a plurality of jobs to determine which of the plurality of jobs require scanning of one or more common subcomponents of the one or more input datasets; and schedule a plurality of jobs that require scanning of one or more common subcomponents of the one or more input datasets, facilitating a single scanning of the one or more common subcomponents to be used as input by each of the plurality of jobs, wherein said scheduling comprises scheduling one or more of the plurality of jobs to share as input data a previously scanned common subcomponent scheduled for a previously scheduled job.

18. The system of claim 17, wherein the at least one processor coupled to the memory operative to schedule a plurality of jobs that require scanning of one or more common subcomponents of the one or more input datasets is further operative to schedule a plurality of jobs, wherein the plurality of jobs is not received simultaneously.

19. The system of claim 18, wherein the at least one processor coupled to the memory operative to schedule a plurality of jobs when the plurality of jobs are not received simultaneously is further operative to facilitate a newly received job to share results of a scanning of common subcomponents with one or more previously received jobs to an extent that there is a temporal overlap.

20. The system of claim 17, wherein the plurality of jobs comprise a plurality of jobs in a MapReduce environment.

21. The system of claim 17, wherein the at least one processor coupled to the memory is further operative to portion the plurality of jobs into a plurality of sub-jobs, wherein one or more sub-jobs of a job sharing scanning of one or more subcomponents with one or more sub-jobs of one or more additional jobs can be scheduled, and remaining sub-jobs of the job wait to be scheduled.

22. An apparatus for scheduling a plurality of jobs sharing input, the apparatus comprising:
- means for partitioning one or more input datasets into multiple subcomponents;
- means for analyzing a plurality of jobs to determine which of the plurality of jobs require scanning of one or more common subcomponents of the one or more input datasets; and
- means for scheduling a plurality of jobs that require scanning of one or more common subcomponents of the one or more input datasets, facilitating a single scanning of the one or more common subcomponents to be used as input by each of the plurality of jobs, wherein said scheduling comprises scheduling one or more of the plurality of jobs to share as input data a previously scanned common subcomponent scheduled for a previously scheduled job.

* * * * *